K. BLOOM.
TRUCK WHEEL IMPELLER.
APPLICATION FILED JULY 25, 1916. RENEWED FEB. 20, 1919.
1,303,534.
Patented May 13, 1919.
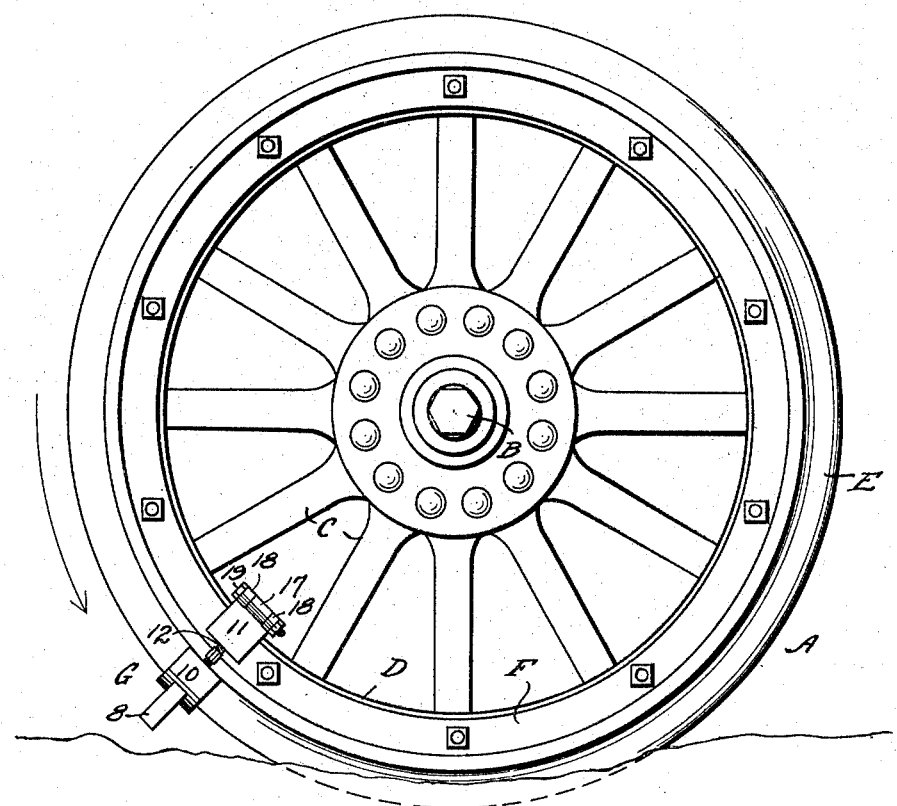
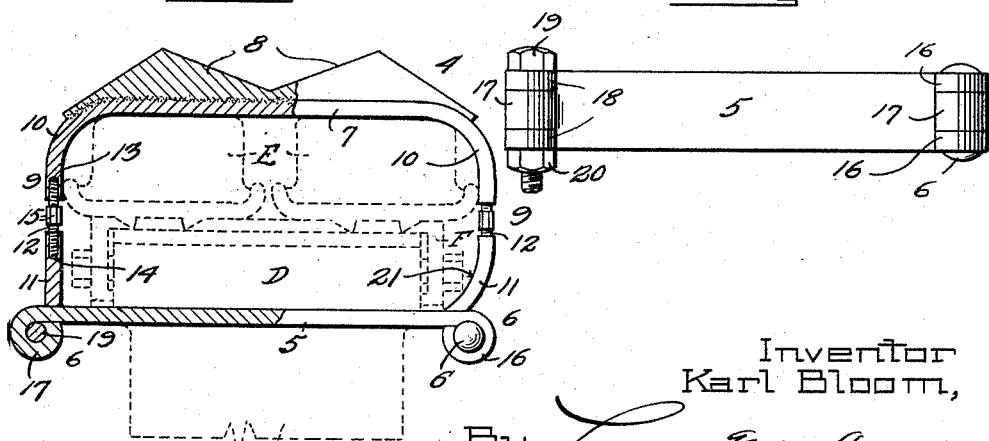
Inventor
Karl Bloom,
By Lancaster and Allwine
His Attorneys.

UNITED STATES PATENT OFFICE.

KARL BLOOM, OF NEW YORK, N. Y.

TRUCK-WHEEL IMPELLER.

1,303,534.      Specification of Letters Patent.      Patented May 13, 1919.

Application filed July 25, 1916, Serial No. 111,182. Renewed February 20, 1919. Serial No. 278,236.

*To all whom it may concern:*

Be it known that I, KARL BLOOM, a citizen of the United States, and a resident of New York, in the county of Bronx and State of New York, have invented a certain new and useful Improvement in Truck-Wheel Impellers, of which the following is a specification.

My present invention relates to attachments for the wheels of motor trucks to embrace portions of the treads of the wheels to impel the same or cause the wheels to move on should their tractive qualities become impaired by entrance into mud holes or icy depressions in the road.

The principal objects of my invention are to provide impellers for motor truck wheels which may be quickly attached to or detached from the wheels; devices of the character described which may be readily adjusted to snugly embrace the tread portions of the particular wheels to which they are attached; and, impellers which are so constructed as to present no projections inwardly of the wheel, liable to engage chains, brake rods, bands, or other elements in close proximity to the wheel.

Other objects of my invention will appear in the following detailed description, taken in connection with the accompanying drawing, forming a part of this specification, and in which drawing:

Figure 1 is a plan view of a motor truck wheel showing an impeller, constructed according to my invention, applied thereto.

Fig. 2 is an enlarged detailed view partly in central vertical section and partly in elevation of an impeller.

Fig. 3 is a bottom plan view of the same.
In the drawing, where similar characters refer to similar parts, A designates a motor truck wheel including a hub B, spokes C, felly D, tire E, and demountable tire retaining rings F; and, G an impeller constructed according to my invention.

The impeller is particularly adapted for use on the wheels of motor trucks which have a comparatively wide tread surface, and which sustain heavy loads. It comprises a tire embracing section 4; a retainer 5 adapted to engage the felly E of the wheel A between spokes C; and, means 6 for detachably connecting the end portions of the tire embracing section 4 with the retainer 5.
Referring first to the tire embracing section 4, it is formed to provide an elongated relatively flat tread engaging portion 7, provided with spurs or ribs 8 on its outer face either formed integral with the portion 7, or otherwise secured thereto, as by welding; and, arms designated generally by 9, extending from the ends of the tread engaging portion 4, to lie laterally of the wheel at each face thereof, when the impeller is disposed in operative relation to the wheel.

It is preferred to form the arms 9 each of two parts 10 and 11, the parts 10 being integral with portion 7, while the parts 11 are adjustably carried by the parts 10 as by tie rods 12 having screw-threaded engagement in alined longitudinally extending screw-threaded bores 13 and 14 provided in each part of arms 10 and 11, said bores being screw-threaded in opposite direction so that as the tie rod 12 is rotated in one direction, the parts 10 and 11 are drawn toward one another whereas, if it is rotated in a counter direction, the parts 11 and 11 are moved away from one another. Each tie rod 12 may be provided with wrench engaging faces 15 disposed within the planes of the faces of the parts of their respective arms, so that there is no obstruction exteriorly of the arms to engage parts of the motor truck.

Referring now to the retainer 5, it may consist of a bar of metal provided with eyes 16 adapted to coöperate with an eye 17, carried by one of the parts 11 at the free end of one of the arms 9, while the opposite end of the bar may be provided with a single eye 17 to coöperate with eyes 18 carried by the other arm at its free end. The means 6, in the example shown, in the form of a bolt, may extend through the alined eyes 16 and 17 of one arm 9, while the means at the opposite end may consist of a bolt 19 extending through alined eyes 17 and 18, a nut 20 being provided turned upon bolt 19 to retain same against casual displacement.

I prefer to arcuate the arm 9, which is disposed inwardly of the vehicle wheel, as indicated at 21, and to have the convex of the arm outermost with respect to the impeller, and under which conditions, the hinged eye 17 is turned outwardly but not to project beyond the convex face of the arm, as clearly shown in Fig. 2. Thus, the impeller may be secured about a portion of the tread of the tire and its felly, snugly engaging the wheel structure laterally but so as to present very little in the way of projections at the interior face of the wheel, avoiding engagement with driving chains, brake rods, etc.

The operation of the impeller is as follows:—

When the vehicle wheel enters a mud hole, or icy depression in the road so that power wheels merely rotate without advancing the vehicle, the operator proceeds to apply one impeller on each driving wheel which is accomplished by removing the nut 20 and bolt 19 permitting the retainer 5 to swing about its pivotal connection with the other arm 9. The device is then placed into operative relation to the truck wheel so that the portion 7 engages the tread of the tire with the arms laterally of the wheel at each face thereof. After swinging the retainer 5 so that its eye 17 is in operative relation to the eyes 18 of arm 9, the bolt 19 may be placed, as hereinbefore described, retaining the impeller on the rim of the wheel in place. If there is play between the retainer 5, and the portion 7, the tie rods 12 may be rotated so as to draw the parts of arms 9 toward each other sufficiently to hold the retainer against movement circumferentially of the wheel. Power is then applied to the driving wheels, and the spurs 8 engaging more solid ground, will impel or cause the wheel to move on whereafter the impeller may be removed from operative relation to the wheel.

Changes in details may be made without departing from the spirit or scope of my invention; but,

I claim:—

1. A truck wheel impeller comprising, a tire embracing section formed to provide an elongated relatively flat tread engaging portion, arms extending from the ends of said tread engaging portion to lie against the side faces of the wheel, each of said arms composed of a pair of sections, means for permitting of rigid adjustable connection between the sections of each arm, whereby the length of the arms may be varied, one of the sections of one of said arms being curved inwardly and rolled outwardly to form a hinge eye lying inwardly of the outermost line of the main body portion of the arm, a retainer hingedly connected with said eye to extend across the felly of a wheel, and means for detachably securing the free end of said retainer to the arm opposite to the arm having the eye formed thereon.

2. A truck wheel impeller comprising with a tire embracing section formed to provide an elongated relatively flat thread engaging portion having arms extending from the ends thereof to lie against the side faces of the wheel, one of said arms being curved in and provided with an outwardly extending hinge eye formed to lie inside of the outermost line of the main body portion of the arm and to avoid lateral extension, a retainer hingedly connected with said eye to be swung across to bear upon the felly of the wheel, and means for detachably securing the free end of said retainer to that arm of the tire embracing section opposite to the arm having the hinge eye formed thereon.

KARL BLOOM.

Copies of this patent may be obtained for five cents each, by addressing the "Commissioner of Patents, Washington, D. C."